(12) United States Patent
Adamson et al.

(10) Patent No.: US 11,078,936 B2
(45) Date of Patent: Aug. 3, 2021

(54) PORTABLE EXTERNAL OIL COOLER PROCESS FOR PERFORMING HYDRAULIC SYSTEM FUNCTIONAL TESTS ON UNFUELED AIRPLANES

(71) Applicant: The Boeing Company, Chicago, IL (US)

(72) Inventors: Chad Roderick Adamson, Black Diamond, WA (US); Charley Shin, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 16/431,192

(22) Filed: Jun. 4, 2019

(65) Prior Publication Data
US 2020/0386249 A1    Dec. 10, 2020

(51) Int. Cl.
*F15B 21/0423* (2019.01)
*B64F 5/00* (2017.01)
(Continued)

(52) U.S. Cl.
CPC .......... *F15B 21/0423* (2019.01); *B64C 9/00* (2013.01); *B64D 2033/024* (2013.01); *B64F 5/00* (2013.01)

(58) Field of Classification Search
CPC .............. B60H 1/00257; B60H 1/3226; B64D 2013/0659; B64D 2033/024; B64F 5/00; B64F 5/60; F15B 21/0423
See application file for complete search history.

(56) References Cited

U.S. PATENT DOCUMENTS

| 5,031,690 A  * | 7/1991 | Anderson | B64F 1/364 |
| | | | 165/43 |
| 6,862,940 B2 * | 3/2005 | Romano | G01N 3/10 |
| | | | 73/168 |

(Continued)

FOREIGN PATENT DOCUMENTS

CN        202038460 U   * 11/2011
RU          2350789 C2  *  3/2009

OTHER PUBLICATIONS

Translation of Patent Document RU 2350789 C2 entitled Translation—RU 2350789 C2 (Year: 2020).*

(Continued)

*Primary Examiner* — Paul Alvare
(74) *Attorney, Agent, or Firm* — Yee & Associates, P.C.

(57) ABSTRACT

An external cooling system for hydraulic fluid of an aircraft hydraulic system. The external cooling system includes a heat exchanger, where an input side of the heat exchanger is connected to a hydraulic fluid reservoir of the aircraft hydraulic system and an output side of the heat exchanger is connected to suction ports of a return side of an electric motor driven pump (EMDP) of the aircraft hydraulic system. The external cooling system operates on 120 VAC power and the hydraulic fluid does not exceed a maximum pressure of 50 pounds per square inch gauge. The EMDP pumps hydraulic fluid through the hydraulic system under conditions wherein fuel tanks in the aircraft are empty, and the external cooling system cools the hydraulic fluid as the EMDP pumps the hydraulic fluid, wherein the hydraulic fluid passes from the hydraulic fluid reservoir and through the external cooling system before entering the EMDP.

20 Claims, 7 Drawing Sheets

(51) Int. Cl.
   *B64C 9/00* (2006.01)
   *B64D 33/02* (2006.01)

(56) References Cited

U.S. PATENT DOCUMENTS

| | | | | |
|---|---|---|---|---|
| 7,658,104 B2* | 2/2010 | Hewitt | ............... | G01L 7/063 |
| | | | | 73/290 R |
| 7,805,947 B2* | 10/2010 | Moulebhar | ............... | F02C 7/32 |
| | | | | 60/787 |
| 2018/0339787 A1* | 11/2018 | Nekkalapudi | ............ | B64F 1/28 |

OTHER PUBLICATIONS

Translation of Patent Document CN 202038460 U entitled Translation—CN 202038460 U (Year: 2020).*

Data Sheet for Series 958 Hydraulic Test Stand by AP Hydraulics entitled AP Hydraulics (Year: 2015).*

* cited by examiner

PORTABLE EXTERNAL OIL COOLER PROCESS FOR PERFORMING HYDRAULIC SYSTEM FUNCTIONAL TESTS ON UNFUELED AIRPLANES

BACKGROUND INFORMATION

1. Field

The present disclosure relates generally to aircraft hydraulic systems and more particularly to externally cooling hydraulic fluid during hydraulic system function tests when fuel tanks in the aircraft are empty.

2. Background

In the airline industry, Hydraulic System Functional Tests (HSFTs) are routinely performed by original equipment manufacturers (OEMs), airlines, and maintenance, repair and overhaul (MRO) facilities.

When an aircraft is in flight, engine driven pumps (EDPs) and electric motor driven pumps (EMDPs) work together to pressurize hydraulic fluid and circulate it through closed hydraulic systems. As the fluid circulates, it heats. On its return to onboard reservoirs the fluid is cooled as it runs through heat exchangers typically found in wing fuel tanks. When the tanks are full, the liquid fuel acts as a heat sink medium that absorbs heat from the heat exchangers as the hydraulic fluid passes through them.

When an airplane is on the ground, the EMDPs can only operate for extended periods if there is enough fuel in the tanks to cool the hydraulic fluid. However, if the wing tanks are empty, the EMDPs can typically only operate for a couple of minutes before the hydraulic fluid heats up beyond acceptable operating temperatures, requiring the system to be shut down in order to cool.

During manufacturing or maintenance of airplanes, the hydraulic system might need to be run so that testing, repairs, or adjustments can be performed on flight control surfaces such as rudders, elevators, flaps, as well as other hydraulic-operated components. Such manufacturing and maintenance procedures are typically performed with the fuel tanks empty. Without the heat sink provided by liquid fuel in the tanks, the circulating hydraulic fluid must be cooled by external ground support equipment.

SUMMARY

An illustrative embodiment provides a method of cooling hydraulic fluid for an aircraft hydraulic system. The method comprises connecting an output side of an external cooling system to a return side of an electric motor driven pump (EMDP) in the hydraulic system and connecting an input side of the external cooling system to a hydraulic fluid reservoir in the hydraulic system. The EMDP pumps hydraulic fluid through the hydraulic system under conditions wherein fuel tanks in the aircraft are empty, and the external cooling system cools the hydraulic fluid as the EMDP pumps the hydraulic fluid, wherein the hydraulic fluid passes from the hydraulic fluid reservoir and through the external cooling system before entering the EMDP.

Another illustrative embodiment provides an external cooling system for hydraulic fluid for an aircraft hydraulic system. The cooling system comprises an output side configured to connect to a return side of an electric motor driven pump (EMDP) in the hydraulic system and an input side of the external cooling system to a hydraulic fluid reservoir in the hydraulic system. The cooling system further comprises a number of heat exchangers configured to cool hydraulic fluid as the EMDP pumps the hydraulic fluid through the hydraulic system under conditions wherein fuel tanks in the aircraft are empty, wherein the hydraulic fluid passes from the hydraulic fluid reservoir and through the external cooling system before entering the EMDP.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
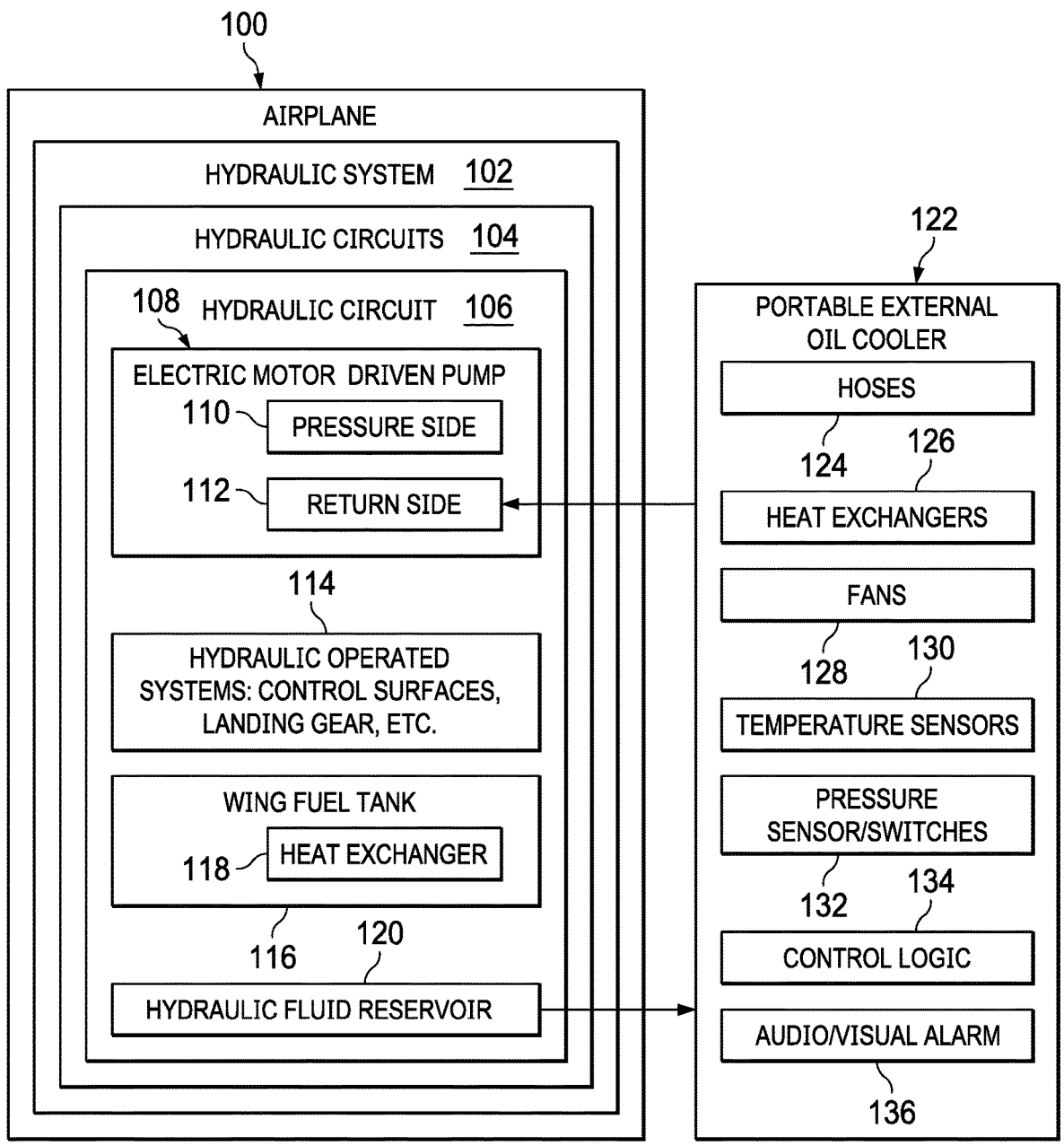
FIG. 1 is a block diagram illustrating an airplane hydraulic system and external oil cooler in accordance with illustrative embodiments.

The illustrative examples recognize and take into account different considerations. For example, the illustrative examples recognize and take into account that EMDPs on aircraft can only operate for a few minutes at a time when the fuel tanks are empty due to overheating of hydraulic fluid.

The illustrative embodiments also recognize and take into account that hydraulic system functional tests (HSFTs) are typically performed with the wing fuel tanks empty, necessitating the use of ground support equipment (GSE) to externally cool the hydraulic fluid.

One type of GSE typically used during manufacturing HSFT is a test bench that supplies the airplane with cooled, pressurized hydraulic fluid for performing HSFTs from a central hydraulic power unit and reservoir built into the manufacturing facility. The central hydraulic power unit consists of an electric motor and pumps as well as heat exchangers which all require 480 volts alternating current (VAC) power. The test bench controls pressure, while temperature is controlled by the heat-exchangers located on the central power unit in the facility. Consequently, HSFTs using test benches are limited by access to special facilities. Such test benches are typically custom designed and cost about $200,000 each. Test benches employ multiple hoses and connections, requiring a two-person setup and teardown. Because the test bench connects to the pressure side of the airplane's hydraulic system it requires high input pressure, typically about 3000 psig.

Another type of GSE used to externally cool hydraulic fluid during HSFTs is mobile hydraulic pump usually referred to as a "mule." Like test benches, mules also externally control fluid pressure and temperature. Mules are self-contained and have an onboard hydraulic fluid reservoir and electric motor pump. The mule gets its power from an electric power source on the ground, not from the airplane and has its own air-fan cooled heat exchanger that transfers heat from the hydraulic fluid to the atmosphere by blowing air over the heat exchanger tubes. Like test benches, mules require a 480 VAC power supply and a two-person setup and teardown and cost in the range of $200,000. Because they also connect to the pressure side of the airplane's hydraulic system, mules also operate at about 3000 psig and have the same safety, ergonomic, and environmental concerns as hydraulic bench tests.

The illustrative embodiments also recognize and take into account that because mules are used in the field, the hoses and couplers as well as cam lock panels often sustain damage that they would otherwise not incur if the HSFTs were performed inside a factory using a hydraulic test bench.

Thus, the illustrative examples provide a portable external oil cooler (PEOC) for performing HSFTs. The PEOC connects to the return side of an airplane hydraulic system and relies on the airplane's own onboard EMDP to provide fluid pressure to the hydraulic system. As a consequence, the PEOC operates at much lower pressures than hydraulic test benches or hydraulic mules. The PEOC system draws hot hydraulic fluid from a reservoir in the airplane hydraulic system and cools it before returning it to the EMDPs. The PEOC thereby allows the airplane's hydraulic system to operate off its own internal pumps without overheating during HSFTs when the wing fuel tanks are empty.

FIG. 1 is a block diagram illustrating an airplane hydraulic system and external oil cooler in accordance with illustrative embodiments. Airplane 100 comprises a hydraulic system 102 that is used to move many elements of the aircraft including, e.g., control elements such as rudders, flaps, elevators, landing gears, etc. The hydraulic system 102 can comprise multiple hydraulic subsystems or self-contained hydraulic circuits 104 responsible for movement of elements in different sections of the airplane 100 such as, e.g., the right and left sides, or fore and aft.

Each hydraulic circuit/subsystem 106 within hydraulic circuits 104 comprises an EMDP 108 that provides fluid pressure from a pressure side ejection port 110 to move the hydraulic fluid through the system. The EMDP 108 is in fluid communication with hydraulic operated systems 114 such as control surfaces, landing gear, etc. The EMDP 108 comprises a return side suction port 112 that sucks hydraulic fluid from a reservoir 120, which is where the fluid returns after passing through the rest of the circuit 106.

As hydraulic fluid is pumped through the system it heats up. In order to prevent the hydraulic fluid from overheating and damaging the hydraulic system, the fluid in each circuit 106 moves through a heat exchanger 118 designed to remove heat from the fluid. Typically, the heat exchanger 118 is located inside a fuel tank 116 in a wing of the airplane.

When the fuel tank 116 is filled, the fuel acts as thermodynamic heat sink to absorb heat from the heat exchanger and cool the hydraulic fluid efficiently. However, when the tank 116 is empty the heat exchanger 118 must transfer heat to air in the tank, which is a far less efficient convection medium than liquid fuel.

The portable external oil cooler (PEOC) 122 provides cooling for the hydraulic fluid when the hydraulic system 102 has to be operated under conditions of empty fuel tanks such as HSFTs performed during manufacture or maintenance. PEOC 122 connects to the hydraulic system 102 via hoses 124 and draws hydraulic fluid from the reservoir 120 and cools it with air-cooled heat exchangers 126 before sending the fluid to the return side 112 of EMDP 108.

The operation of heat exchangers 126 can be supplemented with fans 128 to increase heat convection. As the hydraulic fluid moves through PEOC 122 temperature sensors 130 is configured to monitor the temperature of the fluid, and pressure sensors/switches 132 is configured to monitor air pressure within the fluid reservoir 120. Temperature sensors 130 can be, e.g., resistance temperature detectors (RTDs) mounted on the output ports of the heat exchangers 126. Control logic 134 determines if the temperature and pressure of the hydraulic fluid are within specified operating parameters.

In an illustrative embodiment, if the temperature of the hydraulic fluid drops below ~15.6° C. (60° F.) the control logic 134 deactivates the fans 128 or prevents them from turning on. Conversely, if the temperature of the fluid exceeds 60° C. (140° F.), the fans 128 continue to runs, but the control logic also activates an audio/visual alarm to warn the operator.

The pressure switch 132 is built in to the PEOC 122 to protect the EMDP 108 from insufficient head pressure at the return side suction port 112. Insufficient pressure may lead to pump damage from cavitation. The airplane hydraulic reservoirs 120 typically must be pressurized with air to at least 20 psig (pounds per square inch gauge). If reservoir air pressure drops below 20 psig, the audio/visual alarm indicator 136 is activated by control logic 134 to alert the operators.

Figure 2:
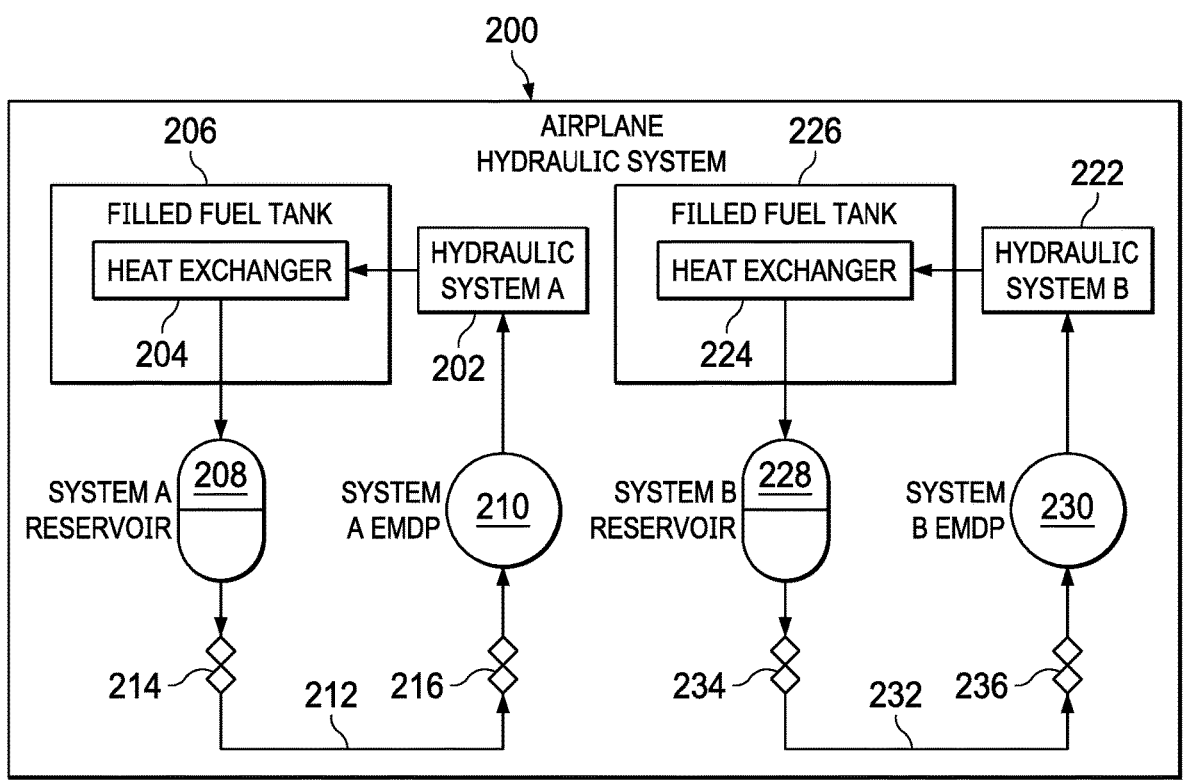
FIG. 2 is a block diagram depicting the layout and operation of an airplane hydraulic system in which illustrative embodiments can be implemented.

FIG. 2 is a block diagram depicting the layout and operation of an airplane hydraulic system in which illustrative embodiments can be implemented. Airplane hydraulic system 200 is an example of hydraulic system 102 depicted in FIG. 1. In this example, the hydraulic system 200 comprises two self-contained subsystems/circuits: hydraulic subsystem A 202 and hydraulic subsystem B 222. Hydraulic subsystem A 202 and hydraulic subsystem B 222 are examples of hydraulic circuits 104 in FIG. 1.

FIG. 2 depicts the movement of the hydraulic fluid under normal operating conditions wherein the fuel tanks 206, 226 in the wings are filled with liquid fuel. The hydraulic fluid is drawn from the fluid reservoirs 208, 228 into the respective suction ports of EMDPs 210, 230. The EMDPs 210, 230 pressurize the hydraulic fluid before it enters hydraulic system A 202 and hydraulic system B 222. Hydraulic system A 202 and hydraulic system B 222 include rudders, flaps, elevators, landing gears, and other hydraulically operated elements of the airplane.

After passing through hydraulic system A 202 and hydraulic system B 222 the hydraulic fluid passes through heat exchangers 204, 224 located in the wing fuel tanks 206, 226. Under conditions of filled tanks, liquid fuel provides an effective heat sink to absorb heat from the heat exchangers 204, 224 and cool the hydraulic fluid before it returns to the reservoirs 208, 228 to begin the circuit again.

Without fuel in the tanks 206, 226 (such as during HSFTs), the hydraulic fluid is not cooled effectively before returning to the reservoirs 208, 228 and recirculating through the system. Therefore, the pumps 210, 230 can only operate for approximately two minutes before having to be shut down to let the system and fluid cool.

Figure 3:
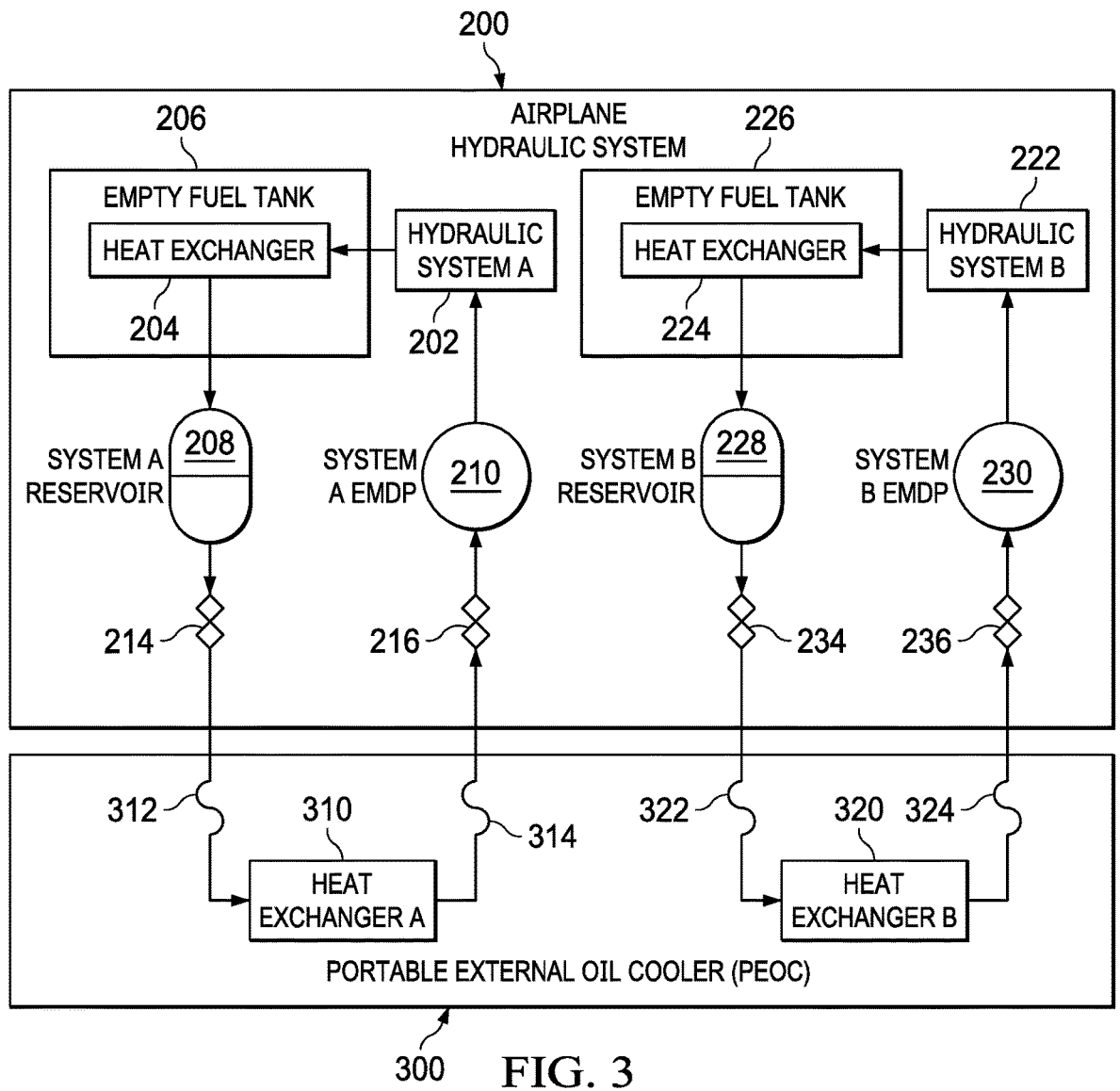
FIG. 3 depicts a portable external cooler connected to an airplane hydraulic system under conditions of empty fuel tanks in accordance with an illustrative embodiment.

FIG. 3 depicts a portable external cooler connected to an airplane hydraulic system under conditions of empty fuel tanks in accordance with an illustrative embodiment. PEOC 300 is an example of PEOC 122 depicted in FIG. 1. In the present example, PEOC 300 comprises two air-cooled heat exchangers: heat exchanger A 310 and heat exchanger B 320, which cool the hydraulic fluid for hydraulic system A 202 and hydraulic system B 222, respectively.

Referring back to FIG. 2, under normal operating conditions, hydraulic fluid flows from reservoirs 208, 228 to EMDPs 210, 230 through fluid lines 212, 232. Fluid line 212 is connected to reservoir 208 and EMDP 210 by quick disconnects 214, 216. Similarly, fluid line 232 is connected to reservoir 228 and EMDP 230 by quick disconnects 234, 236.

As shown in FIG. 3, when PEOC 300 is connected to airplane hydraulic system 200, fluid lines 212, 232 are removed, and the hydraulic fluid is instead routed through PEOC heat exchangers 310, 320 between the reservoirs 208, 228 and pumps 210, 230. Hoses 314, 314 of heat exchanger A 310 are connected to the same quick disconnects 214, 216 to which fluid line 212 is normally connected. Similarly, hoses 322, 324 of heat exchanger B 320 are connected to quick disconnects 234, 236 in place of fluid line 232.

With the fuel tanks 206, 226 empty (as during HSFTs) the hydraulic fluid is not effectively cooled as it passes through heat exchangers 204, 224 before returning to the reservoirs 208, 228. Therefore, PEOC heat exchangers 310, 320 are used to cool the hydraulic fluid before it returns to the EMDPs 210, 230. Though the cooling of the hydraulic fluid occurs in a different place in the hydraulic circuits in FIG. 3, the net thermodynamic effect is the same as the operation of the hydraulic system 200 shown in FIG. 2. Heat exchanger A 310 and heat exchanger B 320 thereby allow the EMDPs 210, 230 to operate continuously without interruption as if the fuel tanks 206, 226 were filled with fuel.

By allowing the airplane hydraulic system 200 to operate using its own internal pumps 210, 230, the PEOC 300 is able to operate at significantly lower pressure than hydraulic test benches and mules because it returns the hydraulic fluid to the return side suction ports of the pumps 210, 230 rather than the pressure side. Whereas a hydraulic mule pump typically operates at 3000 psig and requires a 480 VAC power source, PEOC 300 only requires a maximum pressure of 50 psig and can operate on a 120 VAC power source.

Figure 4:
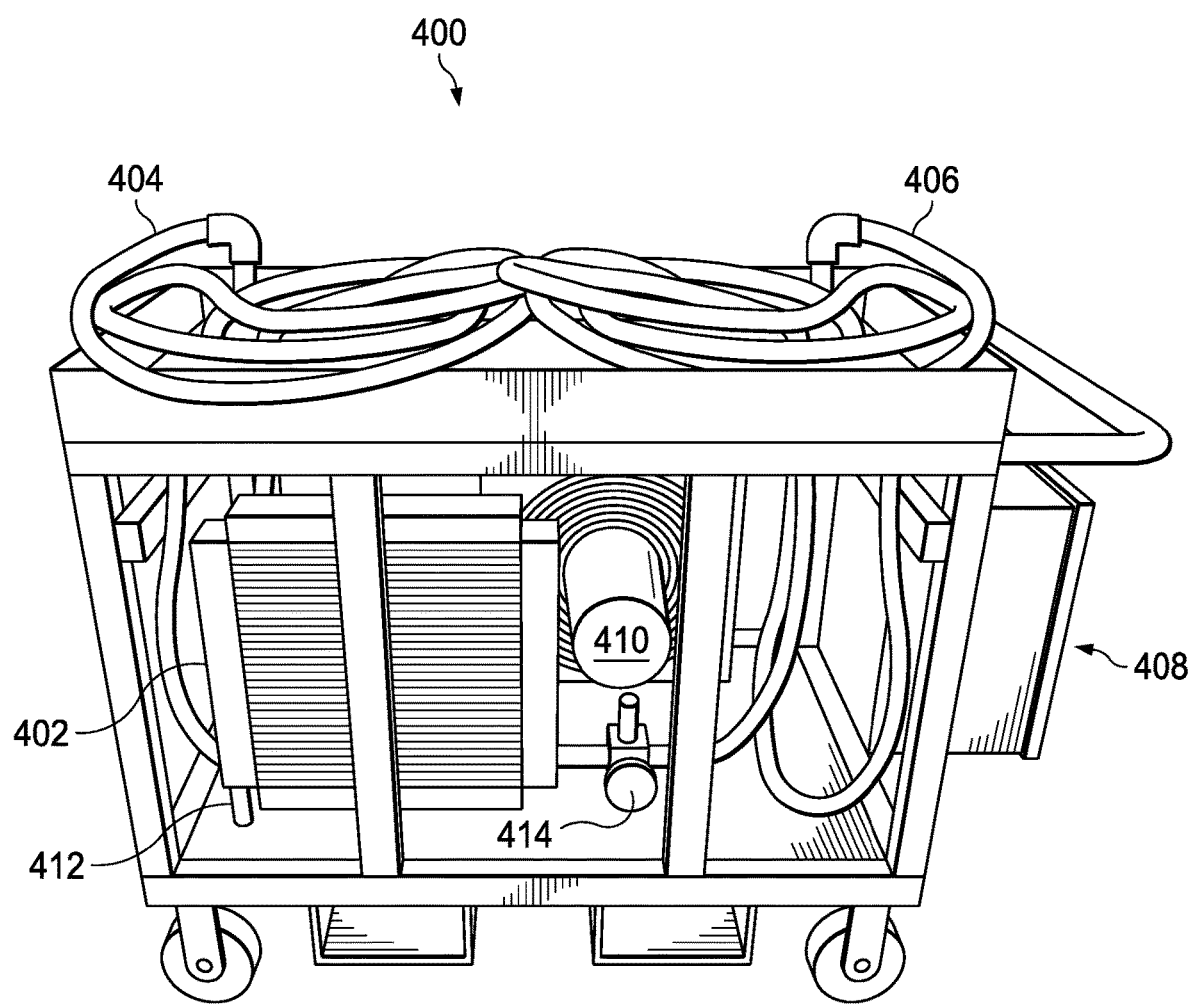
FIG. 4 is a diagram of a portable external cooler in accordance with illustrative embodiments.

FIG. 4 is a diagram of a portable external cooler in accordance with illustrative embodiments. PEOC 400 is an example of PEOC 122 in FIG. 1 and PEOC 300 in FIG. 3. Like PEOC 300 in FIG. 3, PEOC 400 comprises two air-cooled heat exchangers. In the view shown in FIG. 4 only system A heat exchanger 402 is visible. The system B heat exchanger (not visible) is on the opposite side.

The heat exchangers are supplemented by electric fans that can increase air circulation over the exchanger coils and hence convection. In the view shown in FIG. 4, the fan 410 for the system B heat exchanger is visible. A corresponding fan behind system A heat exchanger 402 is hidden from view.

Figure 5:
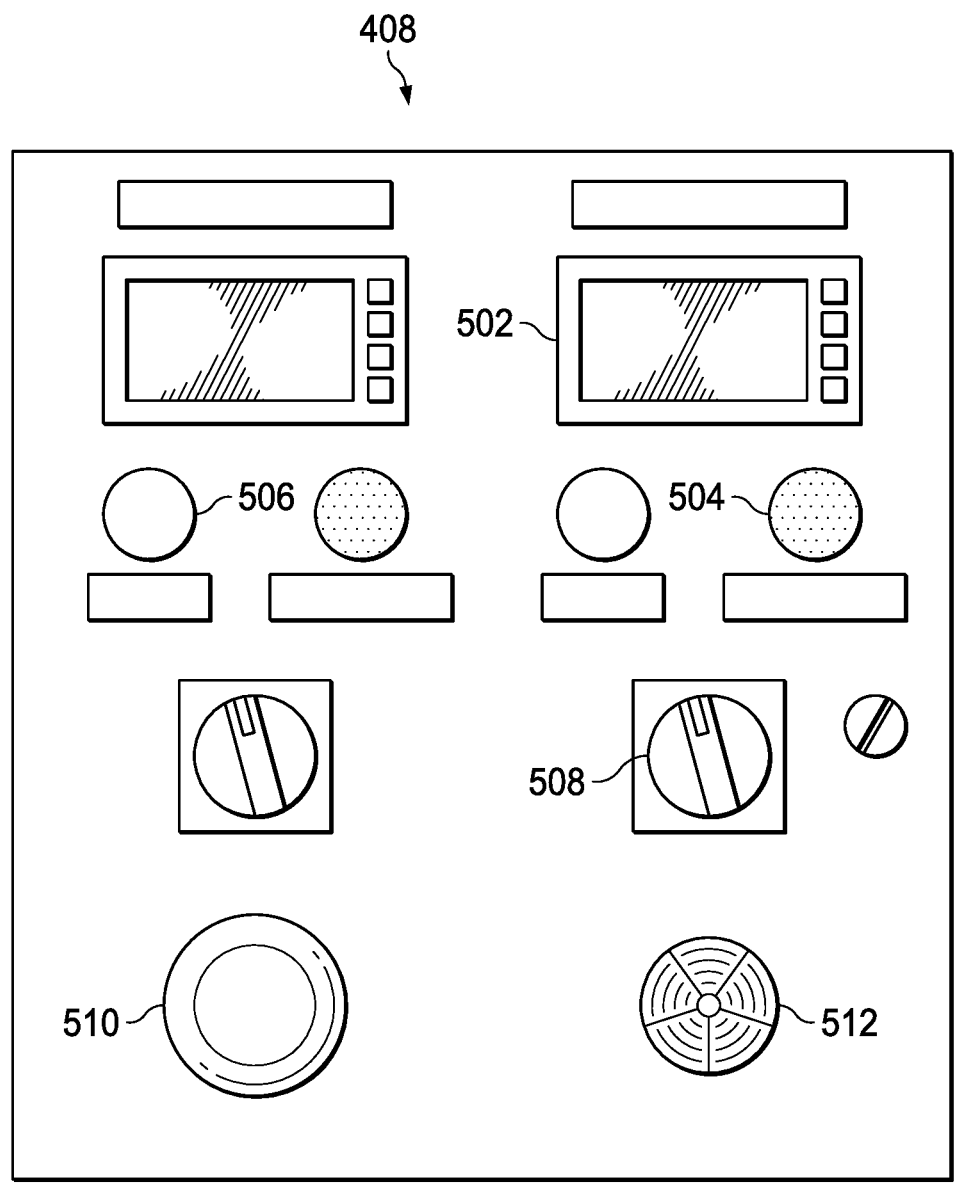
FIG. 5 depicts an electrical control panel for a portable external cooler in accordance with an illustrative embodiment.

PEOC 400 includes hoses 404 for the system A heat exchanger 402 and hoses 406 for the system B heat exchanger. Each heat exchanger also include a temperature sensor 412 and a pressure sensor/switch 414. The electrical control panel 408 for PEOC 400 is shown more clearly in FIG. 5.

Each heat exchanger has a separate temperature display meter 502 that receives temperature data from RTD probes mounted on the output ports of the heat exchangers. Each heat exchanger also has a fan ON indicator 506 and a fan OFF/low temperature indicator 504. Since each heat exchanger operates on a separate, self-contained hydraulic system/circuit, it is possible one system can deviate from the specified temperature range while the other stays within parameters.

There is also a separate on/off selector switch 508 for each cooling fan motor. A motor-stop 510 turns off power to the electric motors.

A high temperature/low pressure audio/visual alarm 512 alerts operators that the hydraulic fluid temperature has exceeded 140° F. or the head pressure on the suction side of the EMDP pump circuit is below 20 psig.

Figure 6:
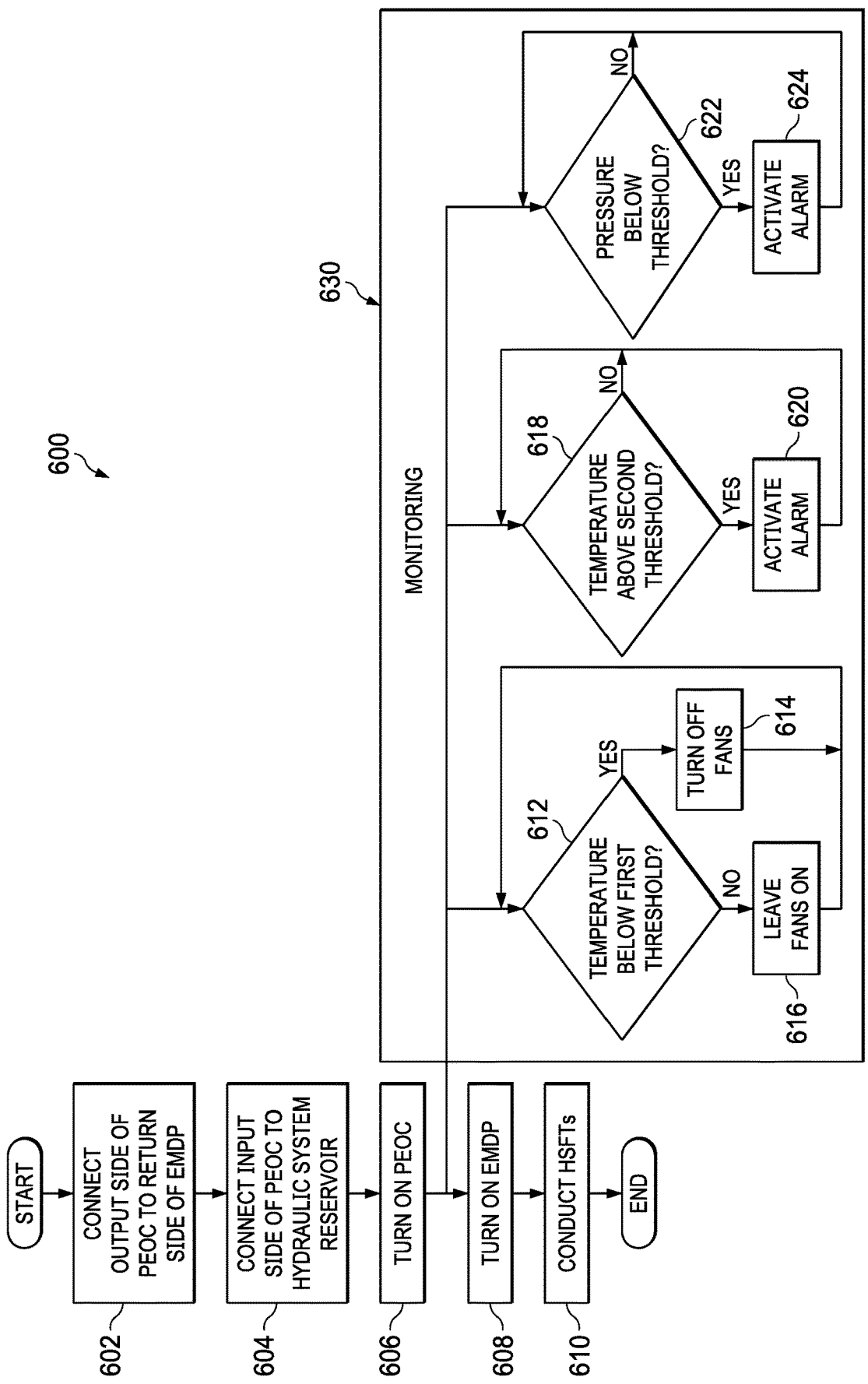
FIG. 6 is a flowchart illustrating the process flow of cooling hydraulic fluid with an external cooler in accordance with illustrative embodiments.

FIG. 6 is a flowchart illustrating the process flow of cooling hydraulic fluid with an external cooler in accordance with illustrative embodiments. Process 600 is an example of the operation of PEOC 300 in FIG. 3. Process 600 begins by connecting the output side of the PEOC to the return side suction port of an EMDP 210/230 in an aircraft hydraulic system (step 602) and connecting the input side of the PEOC to the output port of the hydraulic fluid reservoir 208/228 in the aircraft hydraulic system (step 604).

After the PEOC is connected to the airplane hydraulic system it is turned on (step 606), and the EMDP is turned on to pump fluid (oil) through the hydraulic system (step 608). In this manner, as the EMDP 210/230 is pumping the hydraulic fluid through the hydraulic system under conditions wherein the aircraft fuel tanks 206/226 are empty, the external cooling system 300 cools the hydraulic fluid as it passes from the hydraulic fluid reservoir 208/228 and through the external cooling system before entering the return side of the electric motor driven pump 210/230.

Once the PEOC and hydraulic pumps are turned on, process 600 further comprises conducting (step 610) or performing hydraulic system function tests (HSTFs) on the hydraulic system as the electric motor driven pump 210/230 pumps the hydraulic fluid through the hydraulic system 200 and the external cooling system 300 is cooling the hydraulic fluid. The PEOC allows the EMDP to pump hydraulic fluid indefinitely until the HSFTs are complete.

The operation of the PEOC undergoes continual monitoring (630) by a temperature sensor 130 and pressure sensor 132 during process 600. Monitoring 630 comprising monitoring (steps 612 and 618), by the temperature sensor 130 in the external cooling system, the temperature of hydraulic fluid entering the electric motor driven pump 210/230, and if the temperature of the hydraulic fluid is below the specified lower threshold (step 612) of 15.6° C. (i.e. 60° F.), turning off (step 614) cooling fans in the external cooling system or preventing the cooling fans from turning on, and if the temperature of the hydraulic fluid exceeds the specified upper threshold (step 618) of 140° F. (i.e. 60° C.), activating (step 620) an alarm. Since the fans are already on and the PEOC is working at maximum cooling capacity, the control logic in the PEOC activates the audio/visual alarm to alert the operators.

If the hydraulic fluid does not fall below the lower threshold of ~15.6° C. (i.e. 60° F.), the control logic in the PEOC leaves the fans on (step 616) and continues monitoring temperature (step 612). Similarly, if the hydraulic fluid temperature does not exceed the upper threshold 140° F. (i.e. 60° C.) the PEOC simply continues monitoring (step 618).

Monitoring 630 also comprises monitoring (step 622), by the pressure sensor 132 in the external cooling system, an air pressure in the hydraulic fluid reservoir and activating (step 624) the alarm if the air pressure is below a specified threshold of 20 psig. If the pressure does not fall below the specified threshold the system continues to monitor the pressure (step 622).

Figure 7:
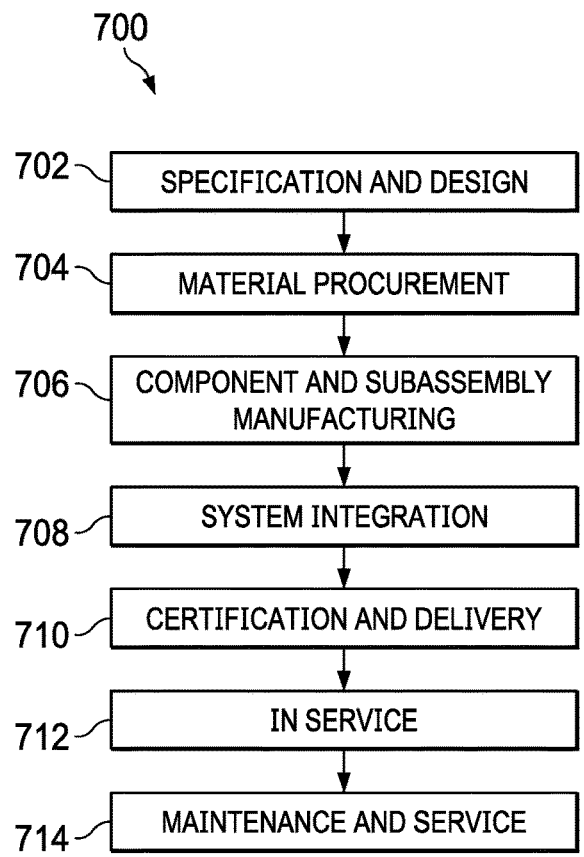
FIG. 7 is an illustration of an aircraft manufacturing and service method in the form of a block diagram in accordance with an illustrative example.
Figure 8:
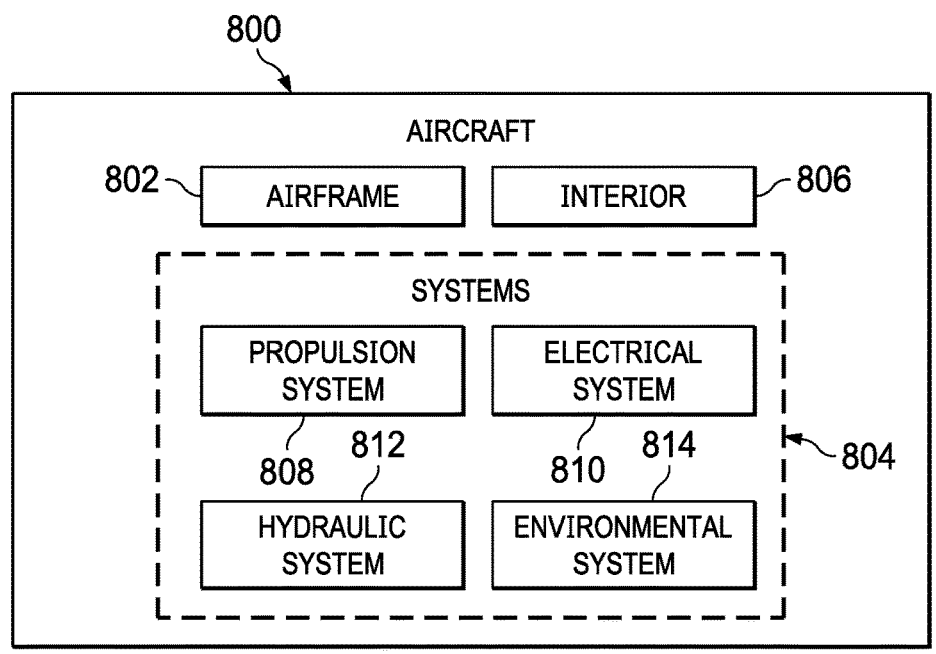
FIG. 8 is an illustration of an aircraft in the form of a block diagram in accordance with an illustrative example.

Illustrative examples of the disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in the form of a block diagram in accordance with an illustrative example. During pre-production, aircraft manufacturing and service method 700 may include specification and design 702 of aircraft 800 in FIG. 8 and material procurement 704.

During production, component and subassembly manufacturing 706 and system integration 708 of aircraft 800 in FIG. 8 takes place. Thereafter, aircraft 800 in FIG. 8 may go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance or service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative example may be implemented. In this example, aircraft 800 is produced by aircraft manufacturing and service method 700 in FIG. 7 and may include airframe 802 with systems 804 and interior 806. Examples of systems 804 include one or more of propulsion system 808, electrical system 810, hydraulic system 812, and environmental system 814. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 700 in FIG. 7. In particular, HSFTs can be performed on aircraft 800 during aircraft manufacturing and service method 700.

In one illustrative example, components or subassemblies produced in component and subassembly manufacturing 706 in FIG. 7 may be fabricated or manufactured in a manner similar to components or subassemblies produced while aircraft 800 is in service 712 in FIG. 7. As yet another example, one or more apparatus examples, method examples, or a combination thereof may be utilized during production stages, such as component and subassembly manufacturing 706 and system integration 708 in FIG. 7. One or more apparatus examples, method examples, or a combination thereof may be utilized while aircraft 800 is in service 712 and/or during maintenance and service 714 in FIG. 7. The use of a number of the different illustrative examples may substantially expedite the assembly of and/or reduce the cost of aircraft 800.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. As used herein, the term "substantially" or "approximately" when used with respect to measurements is determined by the ordinary artisan and is within acceptable engineering tolerances in the regulatory scheme for a given jurisdiction, such as but not limited to the Federal Aviation Administration Federal Aviation Regulations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. The steps shown in the flowchart might occur in a different order than the specific sequence of blocks shown.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of cooling hydraulic fluid for an aircraft hydraulic system of an aircraft, the method comprising:
   connecting an output side of an external cooling system directly to a return side of an electric motor driven pump through a first hose connection, wherein the electric motor driven pump is a component of the
   connecting an input side of the external cooling system directly to a hydraulic fluid reservoir through a second hose connection, wherein the hydraulic fluid reservoir is another component of the aircraft
   turning on the external cooling system; and
   pumping hydraulic fluid through the aircraft hydraulic system onboard the aircraft with the electric motor driven pump under conditions wherein fuel tanks in the aircraft are empty, wherein the external cooling system cools the hydraulic fluid as the hydraulic fluid passes from the hydraulic fluid reservoir and through the external cooling system before entering the return side the electric motor driven pump.

2. The method of claim 1, further comprising conducting hydraulic system function tests on the aircraft hydraulic system as the electric motor driven pump pumps the hydraulic fluid through the aircraft hydraulic system and the external cooling system is cooling the hydraulic fluid.

3. The method of claim 1, wherein the external cooling system comprises a number of air-cooled heat exchangers.

4. The method of claim 1, further comprising:
   monitoring, by a temperature sensor in the external cooling system, a temperature of hydraulic fluid entering the electric motor driven pump;

in response to a determination that the temperature of the hydraulic fluid is below a specified lower threshold, turning off cooling fans in the external cooling system or preventing the cooling fans from turning on; and in response to a determination that the temperature of the hydraulic fluid exceeds a specified upper threshold, activating an alarm.

5. The method of claim 4, wherein the specified lower threshold is 15.6° C.

6. The method of claim 4, wherein the specified upper threshold is 60° C.

7. The method of claim 1, further comprising:
monitoring, by a pressure sensor in the external cooling system, an air pressure in the hydraulic fluid reservoir; and activating an alarm if the air pressure is below a specified threshold.

8. The method of claim 7, wherein the specified threshold is 20 psig.

9. The method of claim 1, wherein the external cooling system operates on 120 VAC power.

10. The method of claim 1, wherein the external cooling system operates at a maximum pressure of 50 psig.

11. A cooling system comprising:
an aircraft; and
an external cooling system for cooling hydraulic fluid for an aircraft hydraulic system of the aircraft, the external cooling system comprising:
an output side including a first hose connected to a return side of an electric motor driven pump, wherein the electric motor driven pump is a component of the aircraft hydraulic system of the aircraft;
an input side including a second hose connected to a hydraulic fluid reservoir, wherein the hydraulic fluid reservoir is another component of the aircraft hydraulic system of the aircraft; and
a number of heat exchangers configured to cool hydraulic fluid as the electric motor driven pump pumps the hydraulic fluid through the aircraft hydraulic system under conditions wherein fuel tanks in the aircraft are empty, wherein the hydraulic fluid passes from the hydraulic fluid reservoir and through the external cooling system before entering the electric motor driven pump;
in operation, a path of the hydraulic fluid through the external cooling system includes the first hose, a heat exchanger of the number of heat exchangers, and the second hose without passing through a pump.

12. The system of claim 11, wherein the external cooling system is configured to cool the hydraulic fluid during hydraulic system function tests on the aircraft hydraulic system of the aircraft.

13. The system of claim 11, further comprising:
a temperature sensor configured to monitor a temperature of hydraulic fluid entering the electric motor driven pump; and
a controller configured to:
turn off cooling fans in the external cooling system or prevent the cooling fans from turning on if the temperature of the hydraulic fluid is below a specified lower threshold; or
activate an alarm if the temperature of the hydraulic fluid exceeds a specified upper threshold.

14. The system of claim 13, wherein the specified lower threshold is 15.6° C.

15. The system of claim 13, wherein the specified upper threshold is 60° C.

16. The system of claim 11, further comprising:
a pressure sensor configured to monitor air pressure in the hydraulic fluid reservoir; and
a controller configured to activate an alarm if the air pressure is below a specified threshold.

17. The system of claim 16, wherein the specified threshold is 20 psig.

18. The system of claim 11, wherein the external cooling system operates on 120 VAC power.

19. The system of claim 11, wherein the external cooling system operates at a maximum pressure of 50 psig.

20. A cooling system comprising:
an aircraft; and
an external cooling system for cooling hydraulic fluid of the aircraft;
the aircraft having an aircraft hydraulic system comprising an
electric motor driven pump and a hydraulic fluid reservoir; the external cooling system comprising:
a number of heat exchangers external of the aircraft;
an input hose connected to the number of heat exchangers and directly connected to the hydraulic fluid reservoir through a first hose connection; and;
an output hose connected to the number of heat exchangers and directly connected to a return side of the electric motor driven pump through a second hose connection;
wherein the number of heat exchangers are configured to cool hydraulic fluid of the aircraft hydraulic system as the electric motor driven pump pumps the hydraulic fluid through the aircraft hydraulic system under conditions wherein fuel tanks in the aircraft are empty, wherein the hydraulic fluid passes from the hydraulic fluid reservoir and through the input hose, the number of heat exchangers, and the output hose before entering the electric motor driven pump, and wherein a path of the hydraulic fluid passes from the hydraulic fluid reservoir and through the input hose, the number of heat exchangers, and the output hose before entering the electric motor driven pump without passing through a pump external to the aircraft.

\* \* \* \* \*